US012438290B2

(12) United States Patent
Di Maggio et al.

(10) Patent No.: US 12,438,290 B2
(45) Date of Patent: Oct. 7, 2025

(54) DUAL CONNECTOR WITH SPRING AND INSULATION DISPLACEMENT CONNECTION (IDC) TERMINALS

(71) Applicants: TE Connectivity Germany GmbH, Bensheim (DE); TE Connectivity Italia Distribution S.r.l., Turin (IT)

(72) Inventors: Stanislas Di Maggio, Turin (IT); Marcello Farinola, Turin (IT); Alessandro Genta, Collegno (IT); Dominik Heiss, Bensheim (DE)

(73) Assignees: TE Connectivity Germany GmbH, Bensheim (DE); TE Connectivity Italia Distribution S.r.l., Turin (IT)

( * ) Notice: Subject to any disclaimer, the term of this patent is extended or adjusted under 35 U.S.C. 154(b) by 325 days.

(21) Appl. No.: 18/152,826

(22) Filed: Jan. 11, 2023

(65) Prior Publication Data

US 2023/0223711 A1 Jul. 13, 2023

(30) Foreign Application Priority Data

Jan. 11, 2022 (IT) ........................ 102022000000272

(51) Int. Cl.
*H01R 4/247* (2018.01)
*H01R 43/26* (2006.01)

(52) U.S. Cl.
CPC ............. *H01R 4/247* (2013.01); *H01R 43/26* (2013.01)

(58) Field of Classification Search
CPC ...... H01R 13/506; H01R 43/01; H01R 4/242; H01R 13/65914; H01R 13/65917; H01R 4/4809; H01R 13/6581; H01R 4/247; H01R 43/26
See application file for complete search history.

(56) References Cited

U.S. PATENT DOCUMENTS

| | | | | |
|---|---|---|---|---|
| 5,083,937 A * | 1/1992 | Bogiel | H02G 3/288 439/441 |
| 5,451,167 A * | 9/1995 | Zielinski | H01R 4/245 439/435 |
| 9,882,293 B1 | 1/2018 | Chen | |
| 11,128,064 B2 * | 9/2021 | Berghahn | H01R 13/2464 |
| 2006/0121771 A1 | 6/2006 | Machado et al. | |
| 2006/0208583 A1 | 9/2006 | Ueno et al. | |
| 2007/0197097 A1 | 8/2007 | Sakaguchi et al. | |

(Continued)

FOREIGN PATENT DOCUMENTS

| | | |
|---|---|---|
| EP | 0653815 A1 | 11/1994 |
| EP | 1014493 A1 | 6/2000 |

(Continued)

OTHER PUBLICATIONS

Japanese Office Action dated Mar. 12, 2024 with English translation, corresponding to Application No. 2023-000359, 12 pages.

(Continued)

*Primary Examiner* — Jean F Duverne
(74) *Attorney, Agent, or Firm* — Barley Snyder

(57) ABSTRACT

An electrical connector for grounding a multicore cable having a shield includes a spring terminal engaging the shield and an insulation displacement connection (IDC) terminal terminating a ground wire. The shield is grounded through the electrical connector.

20 Claims, 8 Drawing Sheets

(56) References Cited

U.S. PATENT DOCUMENTS

| | | | |
|---|---|---|---|
| 2008/0268719 | A1 | 10/2008 | Siemon et al. |
| 2010/0159742 | A1 | 6/2010 | Chen |

FOREIGN PATENT DOCUMENTS

| | | | |
|---|---|---|---|
| EP | 2109352 | A | 4/2009 |
| JP | S63195978 | A | 8/1988 |
| JP | 2006286598 | A | 10/2006 |
| JP | 201338041 | A | 2/2013 |
| WO | 2012136321 | A1 | 10/2012 |

OTHER PUBLICATIONS

Korean Office Action dated Jun. 10, 2024 with English translation, corresponding to Application No. 10-2023-0000269, 9 pages.

Italian Search Report, Application No. 102022000000272, Dated: Aug. 31, 2022, 14 pages.

Extended European Search Report from the European Patent Office dated Apr. 19, 2023, corresponding to Application No. 23151175.9-1201, 14 pages.

EMC Shielding Just Got Quicker and Easier, Jun. 11, 2020, XP055954271, Retrieved from the Internet: URL:https://ecsnz.com/blog/2020-06-11-emc-shielding-just-got-quicker-and-easier [retrieved on Aug. 23, 2022].

* cited by examiner

DUAL CONNECTOR WITH SPRING AND INSULATION DISPLACEMENT CONNECTION (IDC) TERMINALS

CROSS-REFERENCE TO RELATED APPLICATION

This application claims the benefit of the filing date under 35 U.S.C. § 119(a)-(d) of Italian Patent Application No. 102022000000272, filed on Jan. 11, 2022.

FIELD OF THE INVENTION

The present invention relates to a connector and, more particularly, to a dual connector for a multicore cable.

BACKGROUND

Multicore cables are commonly used for High-Voltage applications, for instance in the field of data and communication technology and in the automotive field. Since multicore cables are normally used in close proximity to other electronic components, they must be shielded from electromagnetic interferences and radio-frequency interferences in order to reduce cross-talks between adjacent conductive components. The shield may be composed of braided strands of metal, such as copper or aluminum, a non-braided spiral winding of copper tape, or a layer of conducting polymer. Usually the shield is further covered with a jacket.

The shield must be grounded to be effective. In fact, the grounded shield equalizes electrical stress around the conductor and diverts any leakage current to ground, thus protecting not only the cable insulation, but also the surrounding people and the equipment. However, the wiring solutions known in the art for grounding the shield of multicore cables are typically complex and difficult to implement.

For example, US Patent Application Publication No. 2008/0268719 A1 discloses a multi-component connector for connecting a shielded cable including twisted pairs of wires, wherein a strain relief clip is employed to contact the cable screen (which has been typically folded back onto the outside of the cable). The strain relief is conductive and has a circular section with a plurality of spring members formed therein. The strain relief is coupled to an actuator. The interior surfaces of the actuator include tabs for contacting the strain relief clip so that, when the tabs contact the strain relief clip, the strain relief clip is driven radially inward to secure onto the cable. In this way, the shield of the twisted pairs cable can be grounded, but the multi-component connector has a complex structure.

U.S. Pat. No. 9,882,293 discloses a cable connector for connecting a printed circuit board to a shielded coaxial cable 20. The cable connector includes an insulating base, a housing, a signal terminal, a first and a second ground terminals. The ground terminals are configured to cut through the jacket of the coaxial cable in order to electrically connect the copper braid shield of the cable. At the same time, the first and second ground terminals are soldered to the same ground contact on the circuit board. In this way, the copper braid shield of the cable is grounded. However, the grounding connection requires soldering of the ground terminals and it is thus difficult to realize.

SUMMARY

An electrical connector for grounding a multicore cable having a shield includes a spring terminal engaging the shield and an insulation displacement connection (IDC) terminal terminating a ground wire. The shield is grounded through the electrical connector.

BRIEF DESCRIPTION OF THE DRAWINGS

The present invention will be described with reference to the attached figures in which the same reference numerals and/or signs indicate the same part and/or similar and/or corresponding parts of the machine. In the figures.

DETAILED DESCRIPTION OF THE EMBODIMENTS

Figure 1:
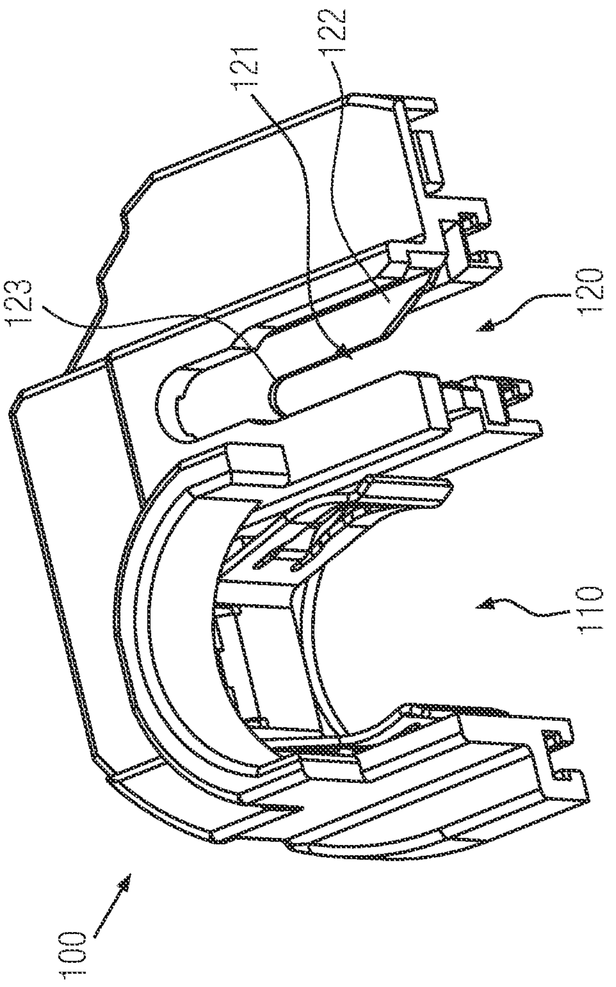
FIG. 1 is a perspective view of an electrical connector according to an embodiment.

In the following, the present invention is described with reference to particular embodiments as shown in the enclosed drawings. Nevertheless, the present invention is not limited to the particular embodiments described in the following detailed description and shown in the figures, but, instead, the embodiments described simply exemplify several aspects of the present invention, the scope of which is defined by the appended claims.

Further modifications and variations of the present invention will be clear for the person skilled in the art. Therefore, the present description must be considered as including all the modifications and/or variations of the present invention, the scope of which is defined by the appended claims.

For simplicity, identical or corresponding components are indicated in the figures with the same reference numbers.

In the description of embodiments of the invention disclosed herein, any reference to direction or orientation is merely intended for convenience of description and is not intended in any way to limit the scope of the present invention. Relative terms such as "lower", "upper", "above", "below", "up", "down", "top" and "bottom" as well as derivative thereof should be construed to refer to the orientation as then described or as shown in the drawing under discussion. These relative terms are for convenience of description only and do not require that the apparatus be constructed or operated in a particular orientation, unless explicitly indicated as such.

FIG. 1 schematically illustrates a three-dimensional view of an electrical connector 100 according to an embodiment of the present invention. The electrical connector 100 comprises a spring terminal 110 and an Insulation Displacement Connection (IDC) 120. In an embodiment, the electrical connector 100 may be employed for cable connection in high-voltage applications and/or in AC current applications.

Figure 3:
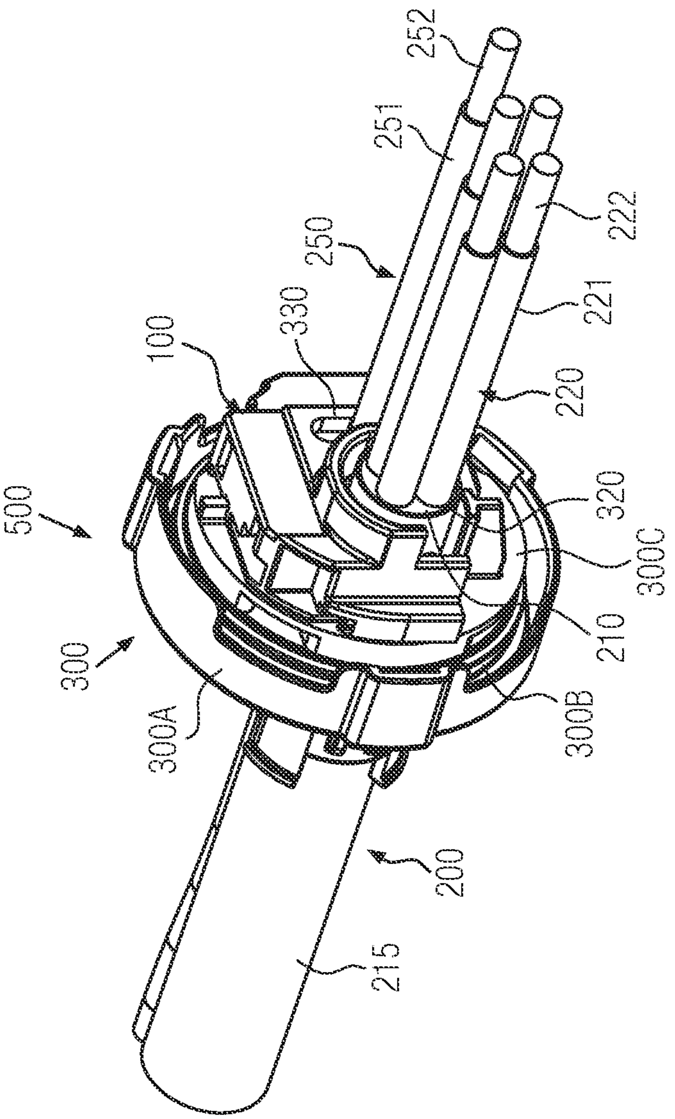
FIG. 3 is a perspective view of a connection system according to an embodiment.

The spring terminal 110 has a substantially semicircular section and is suitable for clamping the outer layer of a multicore cable having a predefined diameter (see for example the multicore cable 200 illustrated in FIG. 3). The spring terminal 110 has a flexible structure. In the rest configuration, the rest diameter of the semicircular section of the spring terminal 110 is smaller than the diameter of the multicore cable. When the multicore cable is inserted into the opening of the spring terminal 110, the spring terminal 110 is deformed and the resulting diameter of the semicircular section corresponds to the diameter of the multicore cable.

The IDC terminal 120 has a slot 121 having a substantially V-shaped section and is suitable for connecting an electrically insulated wire (see for example the ground wire 250 illustrated in FIG. 3). Once the electrically insulated wire is inserted into the contact slot 121 of the IDC terminal 120, the electrical insulation of the wire is cut open by the lower edges 122 of the contact slot 121, so that electrical contact is established between the conductive part of the wire and the upper contact part 123 of the IDC terminal 120. In order to ensure good electrical contact, the contact part 123 must have a width smaller than a diameter of the electrically insulated wire after the insulation is removed.

Figure 2:
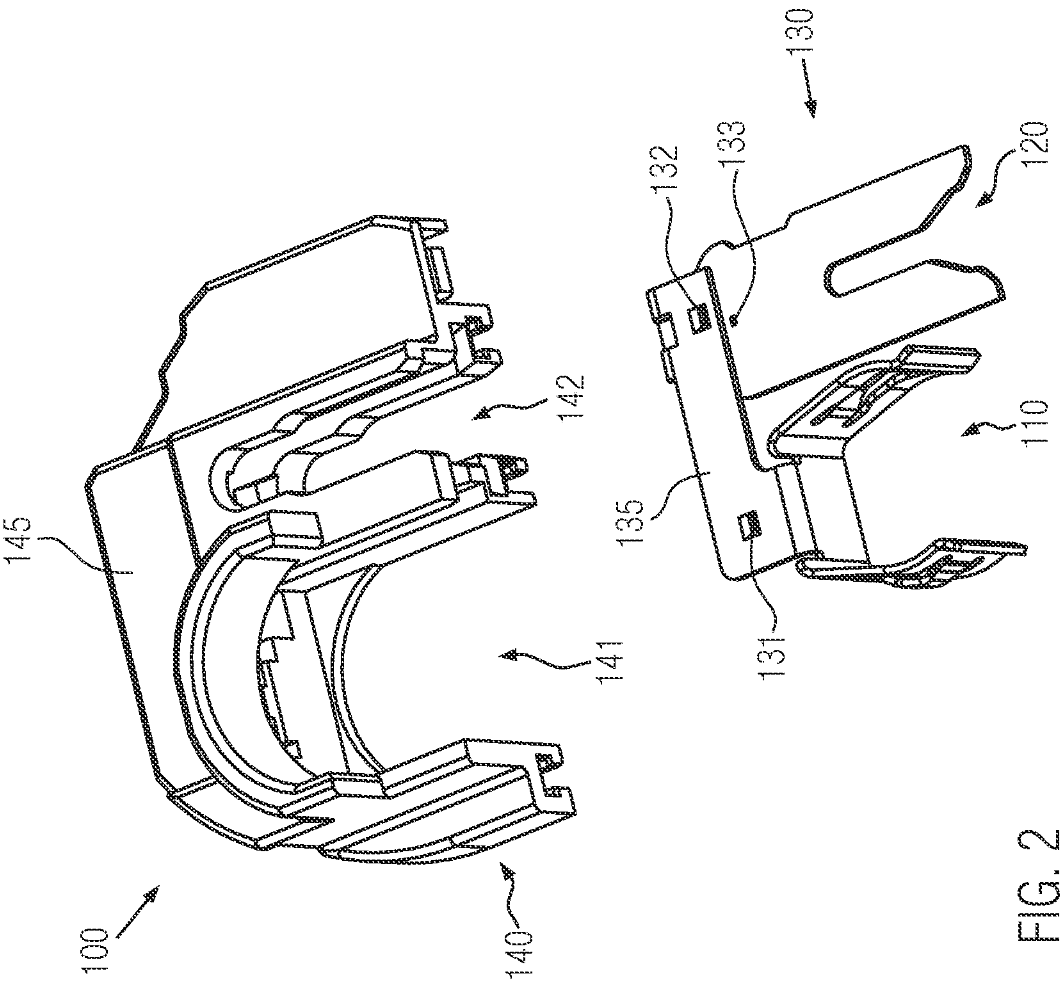
FIG. 2 is an exploded perspective view of the electrical connector of FIG. 1.

As can be seen in detail in the exploded view of the electrical connector 100 of FIG. 2, the electrical connector 100 comprises two mating parts, a conductive component 130 and an insulating component 140. The conductive component 130 comprises the spring terminal 110, the IDC terminal 120 and a connecting portion 135 that connects same, both mechanically and electrically. The spring terminal 110, the IDC terminal 120, and the connecting portion 135 are made of a conductive material, such as copper. The spring terminal 110 is adjacent to the IDC terminal 120 and is connected to the IDC terminal 120 by the connecting portion 135. In an embodiment, the connecting portion 135 is planar and may be a plate. In an embodiment, the spring terminal 110, the IDC terminal 120 and the connecting portion 135 are made of copper The insulating component comprises an insulating case 140, for instance made of a plastic material, encapsulating the conductive component 130. The insulating case 140, as shown in FIG. 2, comprises two openings: a first opening 141 for accommodating the spring terminal 110 and a second opening 142 for accommodating the IDC terminal 120. The insulating case 140 also comprises a gripping portion 145 covering the connecting portion 135, which is suitable for enabling gripping and handling by an operator and/or a machine.

The insulating case 140 protects and insulates the conductive components 130 of the electrical connector, in order to avoid leakages of current from the electrical connector 100. Moreover, the electrical connector 100 may be handled by an operator without risks. In fact, the operator may grab the portion of the electrical connector 100 corresponding to the connecting portion 135 covered by the insulating case 140.

In an embodiment, the insulating case 140 is preliminarily assembled with the conductive component 130 prior to use of the electrical connector 100 for grounding the shielded multicore cable 200.

The conductive component 130 further comprises three fixing elements 131, 132 and 133 for fixing it to the insulating case 140. The fixing elements 131, 132, 133 may comprise protruding tabs to be engaged with corresponding recesses formed in the insulating case 140. In the illustrative embodiment of FIG. 2, two fixing elements 131 and 132 are symmetrically located on opposite ends of a first side of the connecting portion 135 and the third fixing element 133 is located on the IDC terminal 120. Even if three fixing elements are shown in FIG. 2, it must be understood that any number of fixing elements may be formed on the conductive component 130 of the electrical connector 100, for instance, one, two, four, five, or more.

The electrical connector 100 is suitable for grounding a multicore cable 200, such as the one illustrated in FIG. 3. The multicore cable 200 consists of a plurality of single wires 220 covered by a metallic shield 210, which, in turn, is covered by an outer insulating layer 215. The shield 210 may be a braid shield. Each single wire 220 comprises a conductive component 222 covered by an insulating layer 221. The multicore cable 200 illustrated in FIG. 3 comprises four single wires 220. However, it should be understood that it may comprise any number of single wires 220, for instance, two, three, five or more.

For example, for a three-phase connection, a multicore cable 200 comprising four single wires 220 and having a diameter of approximately 15.1 mm may be employed. For example, for a one-phase connection, a multicore cable 200 comprising two single wires 220 and having a diameter of approximately 12.8 mm may be employed.

Before inserting the multicore cable 200 into the electrical connector 100, the multicore cable 200 is prepared in such a way that the outer insulator 215 is partially cut out to expose the shield 210. The spring terminal 110 of the electrical connector 100 then clamps the shield 210 on the multicore cable 200, so as to establish a direct electrical contact. The spring terminal 110 is configured in such a way that, in the rest configuration, the diameter of the semicircular section is smaller than the diameter of the shield 210 and it can be deformed so that, in the clamping configuration, the diameter of the semicircular section equals the diameter of the shield 210. In this way, once the pre-cut multicore cable 200 is inserted into the corresponding opening of the spring terminal 110, direct electrical contact between the spring terminal 110 and the shield 210 is ensured.

In an embodiment, the diameter of the semi-circular section of the spring terminal 110 in the connection configuration may be equal to the diameter of the shield 210 of the multicore cable 200, i.e. equal to the diameter of the multicore cable 200 once the outer insulating layer 215 has been removed, in order to ensure clamping of same. In an embodiment, the diameter of the semi-circular section of the spring terminal 110 may be adaptable to the predefined diameter of the shield 210 of the multicore cable 200 and/or the predefined diameter of the multicore cable 200. For example, the size of the multicore cable 200 may vary depending on to the required standards and on the applications of the cable.

The IDC terminal 120 of the electrical connector 100 is used to terminate the ground wire or Protective Earth (PE) wire 250. The ground wire 250 comprises an insulating layer 251 and a conductive wire 252, as shown in FIG. 3. In IDC technology, an electrical connection between the shield 210 of the multicore cable 200 and the conductive wire 252 is established and the shield 210 of the multicore cable 200 is connected to the earth. The connection to the earth of the shield 210 is necessary to protect the outer insulator 215 and the single wires 220 of the multicore cable 200 itself, as well as the environment and the people surrounding the multicore cable 200, from potential electrostatic discharges. The shielding and the grounding of the multicore cable 200 are especially important in high voltage applications, such as in the field of telecommunications and/or in the automotive field.

In an embodiment, the ground wire 250 is a single wire having a section, for instance, of 6 $mm^2$. The width of the IDC terminal 120 may be configured to be smaller than the diameter of the single ground wire 250 after removal of the insulating layer.

As can be seen in the schematic illustration of FIG. 3, the electrical connector 100 connecting the multicore cable 200 to the ground wire 250 abuts against a support element 300. The electrical connector 100 and the support element 300 form a connection system 500.

The support element 300, as shown in FIG. 3, includes three components: a cover 300A, a family seal 300B and a seal retainer 300C. Two cavities 320, 330 for accommodating the multicore cable 200 and the ground wire 250, respectively, are formed in the support element 300, i.e. in each component forming the support element 300. The family seal 300B seals the whole system and the seal retainer 300C ensures a stable positioning of the cables. In an embodiment, the support element 300 has a substantially circular section.

The process for assembling the connection system 500, the multicore cable 200 and the ground wire 250 is described in detail with reference to FIGS. 4A to 4D.

Figure 4B:
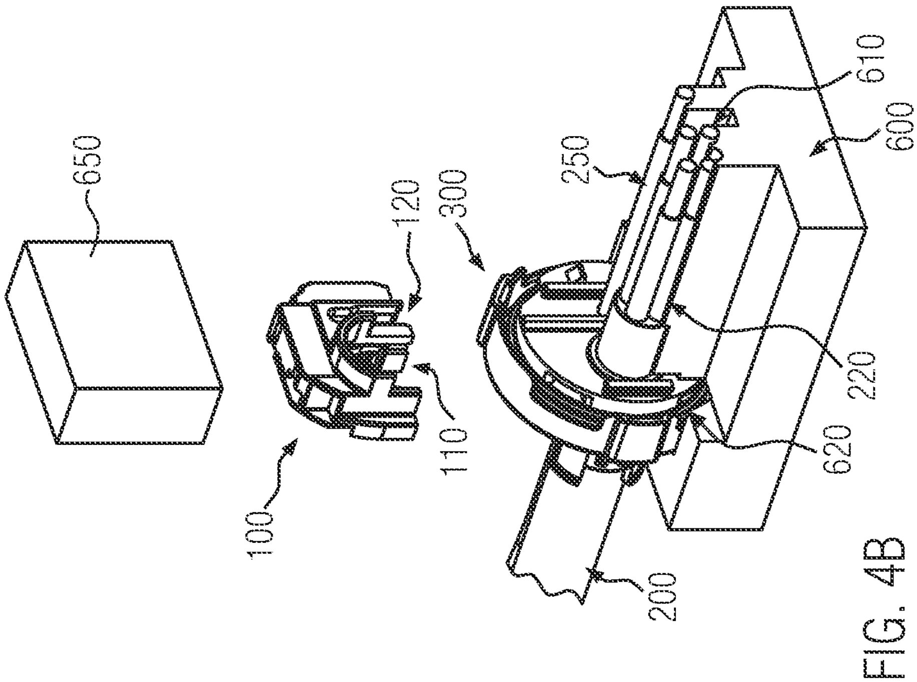
FIG. 4B is a perspective view of a further step of the process for assembling the connection system.
Figure 4A:
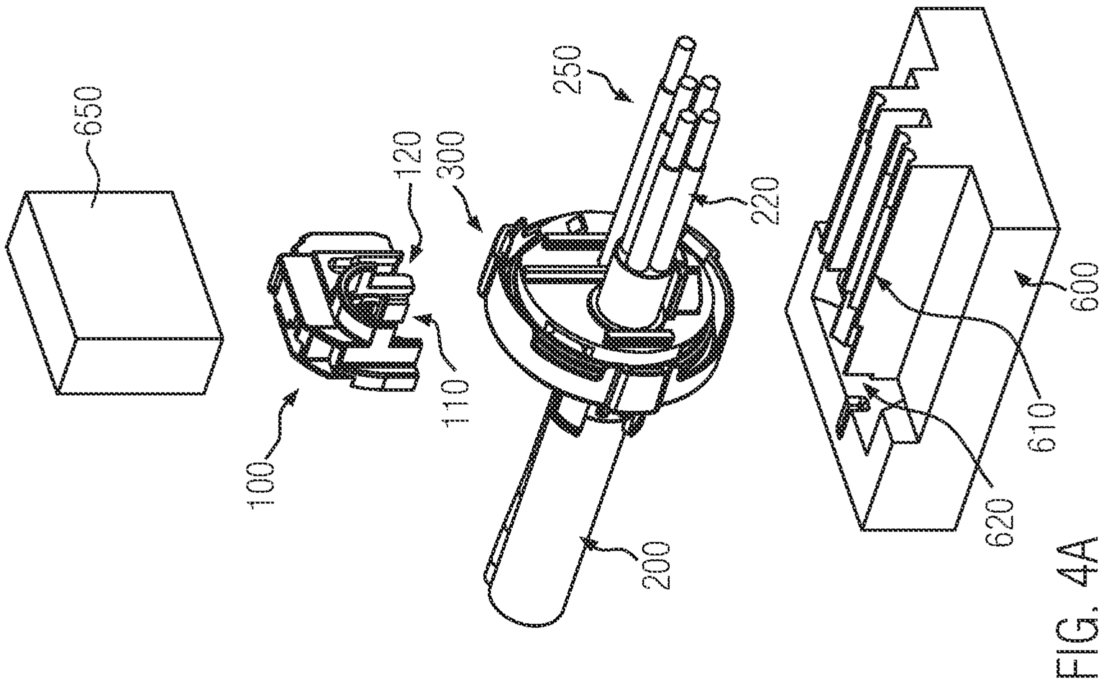
FIG. 4A is a perspective view of a first step of a process for assembling the connection system.

FIG. 4A schematically illustrates a first step of the assembly process of the cables 200, 250 and the support element 300. Before inserting the cables 200, 250 into the electrical connector 100, the end portions of each single wire 220 and of the ground wire 250 are pre-cut to partially remove the insulating layers 221 and 251, respectively. The multicore cable 200 is then inserted into the first cavity 320 and the ground wire 250 is inserted into the second cavity 330 of the support element 300. For instance, the diameter of the first cavity 320 may correspond to the diameter of the multicore cable 200. For instance, the diameter of the second cavity 330 may correspond to the diameter of the ground wire. In an embodiment, the support element 300 comprises a sealing component.

After insertion of the cables into the corresponding cavities, the pre-cut end portions of the insulating layers 221 and 251 are removed. In this way, the end portions of the single wires 220 and of the ground wire 250 are ready for the successive electrical connections. In various embodiments, the free ends of the single wires of the multi-core cable 200 and of the ground wire 250 may be connected to other electrical devices, for instance by crimping and/or soldering connection.

As schematically illustrated in FIG. 4B, the connection system comprising the support element 300, the multicore cable 200 and the ground wire 250 is accommodated into a positioning tool 600, such as a positioning tool of a machine. For instance, the single wires 220 and the ground wire 250 may be accommodated into corresponding positioning guides 610 of the positioning tool 600 and the support element 300 may be accommodated into a corresponding positioning recess 620 of the position tool 600. The electrical connector 100 is positioned above the support element 300 and is aligned with it, so that the spring terminal 110 is aligned with the multicore cable 200 and the IDC terminal 120 is aligned with the ground wire 250.

At a later stage, schematically illustrated in FIG. 4C, the electrical connector 100 is pushed by a pushing tool 650 and it is lowered so as to contact the upper extremity of the support element 300. The electrical connector 100 is hence moved to a pre-assembly position, wherein the spring terminal 110 and the IDC terminal 120 are aligned with the multicore cable 200 and the ground wire 250, respectively, and at least one portion of the electrical connector 100 is in contact with at least one portion of the support element 300. Thanks to the fact that the support element 300 is accommodated into the positioning recess 620 and the single wires 220 and the ground wire 250 are accommodated into the corresponding positioning guides 610 of the positioning tool 600, by displacing the electrical connector 100, it is possible to precisely position it with respect to the multicore cable 200 and the ground wire 250 and it is possible to establish the electrical connection.

Figure 4D:
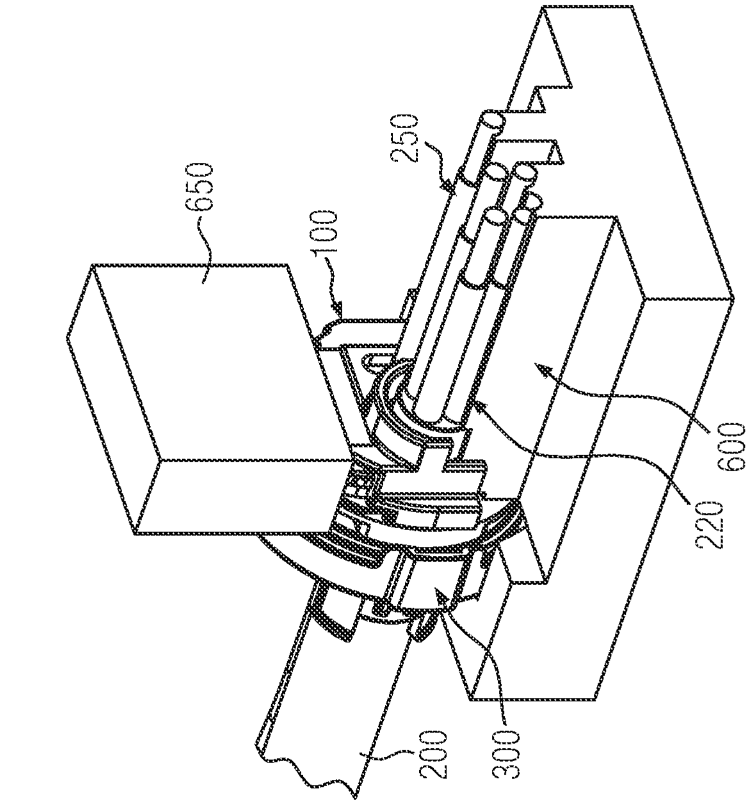
FIG. 4D is a perspective view of a further step of the process for assembling the connection system.
Figure 4C:
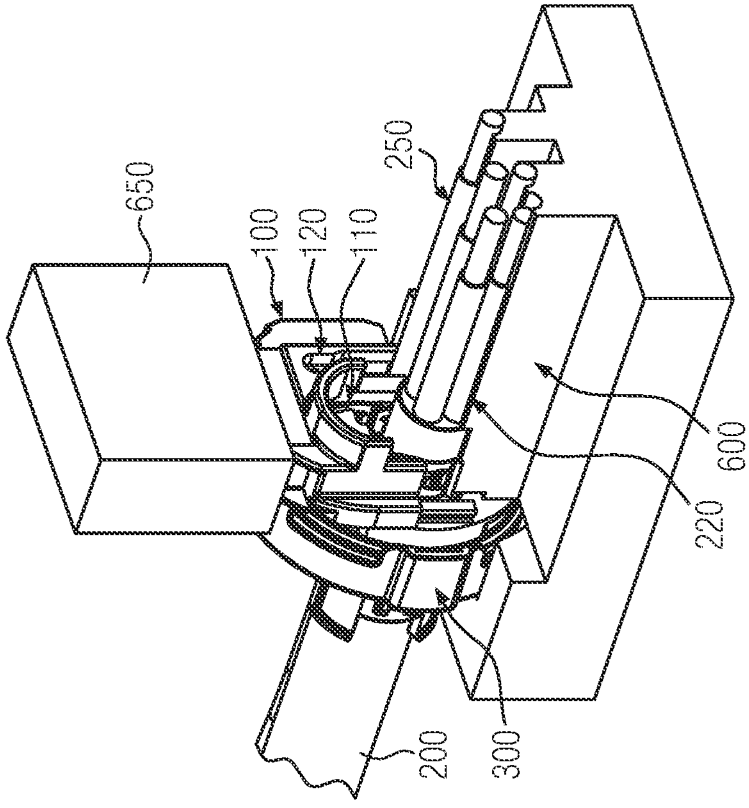
FIG. 4C is a perspective view of a further step of the process for assembling the connection system.

As schematically illustrated in FIG. 4D, by further pushing and lowering the electrical connector 100 by the pushing tool 650, it is possible to displace it from the pre-assembly position to a connection position, which corresponds to the configuration, wherein the multicore cable 200 is clamped by the spring terminal 110, and the ground wire 250 is terminated by the IDC terminal 120.

In an embodiment, the spring terminal 110 and the IDC terminal 120 may be attached to the same side of the connecting portion 135, for instance on the same side of the plate forming the connecting portion 135. The spring terminal 110 and the IDC terminal 120 may be designed so that, when the contact portion of the spring terminal 110 clamps the shield 210 of the multicore cable 200, the contact slot 121 of the IDC terminal 120 reaches the conductive part of the ground wire 250, after cutting the insulating layer 251 of the ground wire 250.

Figure 5:
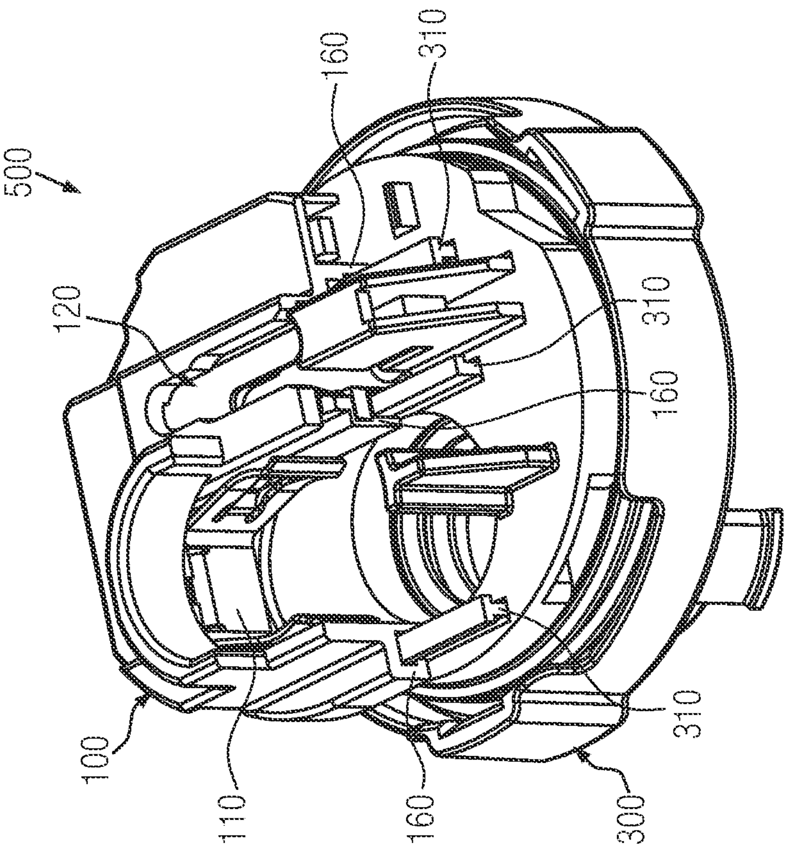
FIG. 5 is a perspective view of the connection system without a multicore cable and a ground wire.

While displacing the electrical connector 100 from the pre-assembly position to the connection position, the electrical connector 100 slides along corresponding guiding element 310 formed on the support element 300 (which are illustrated in particular FIG. 5).

Due to the particular geometry of the electrical connector 100, wherein the spring terminal 110 is adjacent to the IDC terminal 120, by displacing the electrical connector 100, it is possible to simultaneously engage and connect the shield 210 of the multicore cable 200 and the ground wire 250. In other words, the spring terminal 110 and the IDC terminal 120 are aligned, so that when the electrical connector 100 is pushed towards the wires 220 and 250, accommodated into the positioning guides 610, the spring terminal 110 can clamp the shield 210, and, at the same time, the IDC terminal 120 can terminate the ground wire 250. In this way, the shield 210 of the multicore cable 200 is grounded. This configuration has the advantage that the assembly process and the grounding of the shield 210 of the multicore cable 200 is carried out in a fast and efficient way.

Figure 6:
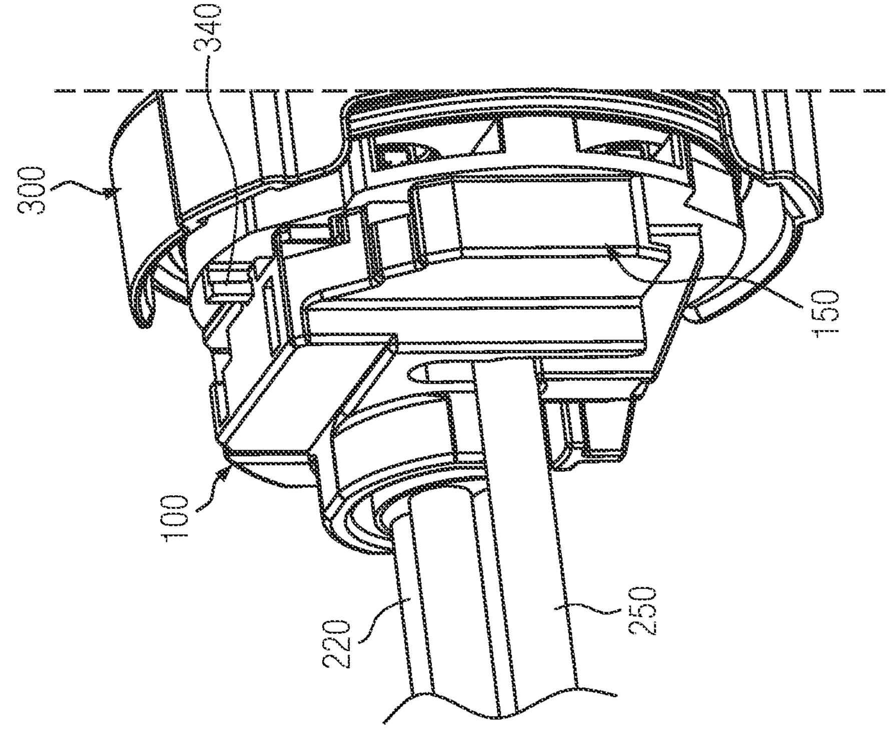
FIG. 6 is a perspective view of a connection between the electrical connector and a support element.

After displacement of the electrical connector 100 to the connection position, the reciprocal position between the electrical connector 100 and the support element 300 is fixed by the corresponding locking device 340 (see in particular FIG. 6). Therefore, a stable electrical connection between the cables 200 and 250 and the electrical connector 100 is ensured.

The details of the structure of the guiding element 310 formed in the support element 300 are visible in FIG. 5. In FIG. 5, it is possible to see that the electrical connector 100 comprises a sliding device 160 formed on the (lower) side facing the support element 300. The sliding device 160 accommodates predefined guiding element 310 formed on the support element 300 and enables sliding of the electrical connector 100 along the support element 300 between a first position and a second position. The first position corresponds to a configuration of partial assembly between the electrical connector 100 and the support element 300 and the second position corresponds to a configuration wherein the shield 210 and the ground wire 250 are electrically connected through the electrical connector 100.

The details of the structure of the locking device 340 formed in the support element 300 are described with reference to FIG. 6. Once the electrical connector 100 has been displaced to the connection position, the reciprocal position between the electrical connector 100 and the support element 300 is fixed by engaging the locking device 340 formed on the support element 300 with the corresponding locking device 150 formed on the electrical connector 100. For example, the locking device 340 may comprise protruding elements, which are configured to be coupled with corresponding tabs 150 formed on the electrical connector 100.

Figure 7B:
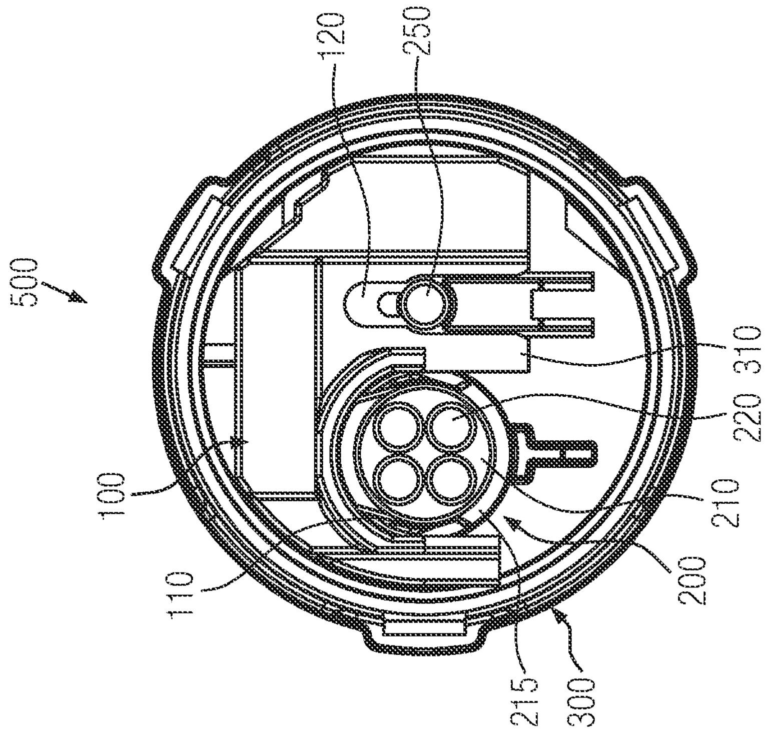
FIG. 7B is an end view of the connection system in an assembled configuration.
Figure 7A:
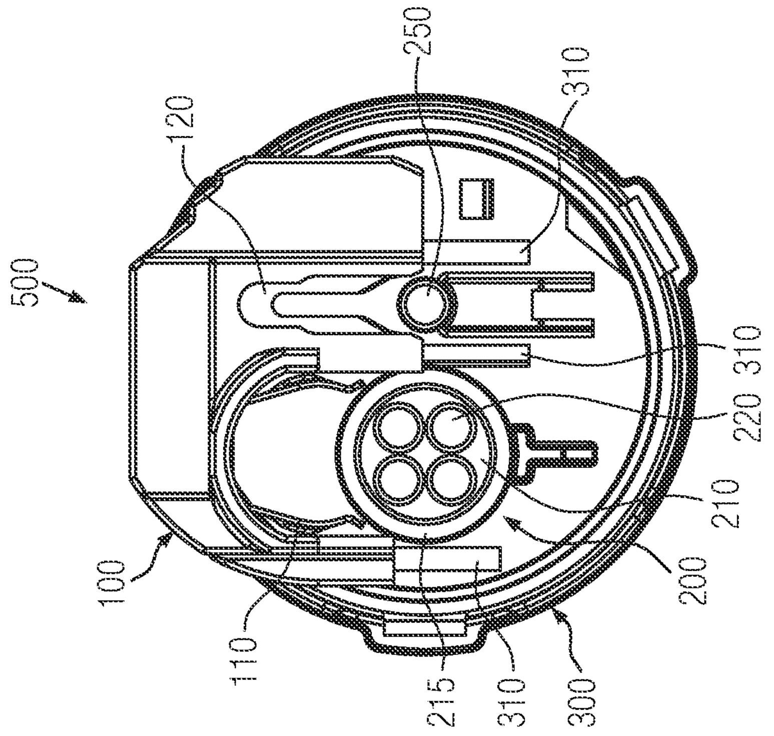
FIG. 7A is an end view of the connection system in a pre-assembled configuration.

The connection system 500 comprising the electrical connector 100 and the support element 300 is provided to the customer in the pre-assembled configuration, wherein the electrical connector 100 is partially engaged with the support element 300 (see FIG. 7A). In this way, the customer only needs to push the electrical connector 100 to the connection or assembled configuration (see FIG. 7B), as described above, in order to establish the electrical connector between the shield 210 of the multicore cable 200 and the ground wire 250.

According to an illustrative but non-limiting configuration, the support element 300 may form a cover element for a connector housing. Therefore, the connection system 500 with the multicore cable 200 and the ground wire 250 may be used to cover a corresponding housing of a connector.

According to a further embodiment of the present invention, a method for assembling the connection system as the ones described above is provided, the method comprising the following steps:

a) accommodating the multicore cable 200 and the ground wire 250 into the support element 300;

b) pre-assembling the electrical connector 100 and the support element 300;

c) mating the electrical connector 100 and the support element 300 so as to electrically connect the shield 210 and the ground wire 250 through the electrical connector 100.

According to a further embodiment of the present invention, a method is provided wherein the step c) is carried out by moving the electrical connector 100 from a first position, corresponding to the configuration of pre-assembly, to a second position, corresponding to a configuration wherein the shield 210 and the ground wire 150 are electrically connected through the electrical connector 100.

According to a further embodiment of the present invention, a method is provided, wherein the step c) is carried out so that the spring terminal 110 engages the shield 210 and, at the same time, the IDC terminal 120 terminates the ground wire 150.

According to a further embodiment of the present invention, a method is provided further comprising the following step:

d) blocking the electrical connector 100 in the second position corresponding to a configuration wherein the shield 210 and the ground wire 150 are electrically connected through the electrical connector 100.

In the electrical connector 100, the electrical connection for grounding a shielded multicore cable 200 is realized in a simple, fast and efficient way and the product quality is improved. Moreover, the electrical connector 100 is compact and easy to handle and the connection between the shield 210 of the multicore cable 200 and the ground wire 250 may be realized at any point along the length of the cables, so that the wire length can be optimized for further connection of the ends of the wires. Furthermore, since the ground wire 250 is connected to the corresponding terminal 120 by the IDC technology, there is no need to preliminarily strip or treat the ground wire 250 before connecting it to the IDC terminal 120 and to the electrical connector 100. Moreover, the spring terminal 110 may easily engage the shield 210 of the multicore cable 200 in order to establish an electrical connection. Thanks to the present solution, the electrical connector 100 firmly connects the shield 210 of the multicore cable 200 to the ground wire 250.

While the invention has been described with respect to embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those of ordinary skill in the art are familiar have not been described herein in order not to unnecessarily obscure the invention described. For example, the spring terminal technology and the IDC technology have not been described in detail, because they are considered to be known to the skilled person.

Accordingly, it is understood that the invention is not to be limited by the specific illustrative embodiments, but only by the scope of the appended claims.

What is claimed is:

1. An electrical connector for grounding a multicore cable having a shield, comprising:

an insulating case having a first opening and a second opening adjacent the first opening;

a spring terminal engaging the shield, the spring terminal is accommodated in the first opening; and an insulation displacement connection (IDC) terminal terminating a ground wire, the IDC terminal is accommodated in the second opening, the shield is grounded through the electrical connector, the spring terminal engages the shield at the same time the IDC terminal terminates the ground wire.

2. The electrical connector of claim 1, wherein the spring terminal is adjacent to the IDC terminal.

3. The electrical connector of claim 2, wherein the spring terminal is connected to the IDC terminal by a connecting portion.

4. The electrical connector of claim 3, wherein the connecting portion is planar.

5. The electrical connector of claim 3, wherein the insulating case covers the spring terminal, the IDC terminal, and the connecting portion.

6. The electrical connector of claim 5, further comprising a plurality of fixing elements fixing the spring terminal, the IDC terminal, and the connecting portion in the insulating case.

7. The electrical connector of claim 1, wherein the spring terminal and the IDC terminal are aligned.

8. The electrical connector of claim 7, wherein the spring terminal engages the shield and the IDC terminal simultaneously terminates the ground wire.

9. The electrical connector of claim 1, wherein the spring terminal has a semi-circular section matching a diameter of the multicore cable.

10. A connection system, comprising:

an electrical connector for grounding a multicore cable having a shield, the electrical connector including an insulating case having a first opening and a second opening adjacent the first opening, a spring terminal engaging the shield and an insulation displacement connection (IDC) terminal terminating a ground wire, the spring terminal is accommodated in the first opening and the IDC terminal is accommodated in the second opening, the shield is grounded through the electrical connector, the spring terminal engages the shield at the same time the IDC terminal terminates the ground wire; and a support element accommodating the multicore cable and the ground wire, the insulating case connects to the support element and the electrical connector mates with the support element to electrically connect the shield and the ground wire.

11. The connection system of claim 10, wherein the support element includes a guiding element and the electrical connector is movable along the guiding element between a first position and a second position.

12. The connection system of claim 11, wherein the first position corresponds to a partial assembly between the electrical connector and the support element and the second position corresponds to a configuration in which the shield and the ground wire are electrically connected through the electrical connector.

13. The connection system of claim 12, wherein the support element has a first cavity accommodating the multicore cable and a second cavity accommodating the ground wire.

14. The connection system of claim 10, wherein the support element has a locking device blocking a position of the electrical connector in a state in which the shield and the ground wire are electrically connected through the electrical connector.

15. The connection system of claim 10, wherein the support element has a cover, a family seal sealing the connection system, and a seal retainer ensuring a stable positioning of the multicore cable and the ground wire.

16. The connection system of claim 10, wherein the insulating case is received into a center of the support element.

17. The connection system of claim 10, wherein the support element has a substantially circular shape.

18. A method for assembling a connection system, comprising:

providing the connection system including an electrical connector and a support element, the electrical connector including a spring terminal and an insulation displacement connection (IDC) terminal;

accommodating a multicore cable having a shield and a ground wire in the support element;

pre-assembling the electrical connector and the support element; and mating the electrical connector and the support element to electrically connect the shield and the ground wire through the electrical connector, the pre-assembling step is carried out so that the spring terminal engages the shield and the IDC terminal simultaneously terminates the ground wire.

19. The method of claim 18, wherein the pre-assembling step is carried out by moving the electrical connector from a first position corresponding to a pre-assembled configuration to a second position corresponding to an electrical connection of the shield and the ground wire through the electrical connector.

20. The method of claim 19, further comprising blocking the electrical connector in the second position.

* * * * *